No. 847,126. PATENTED MAR. 12, 1907.
C. STEFFEN.
PROCESS FOR THE TREATMENT OF BEET ROOT, &c.
APPLICATION FILED JULY 29, 1903.
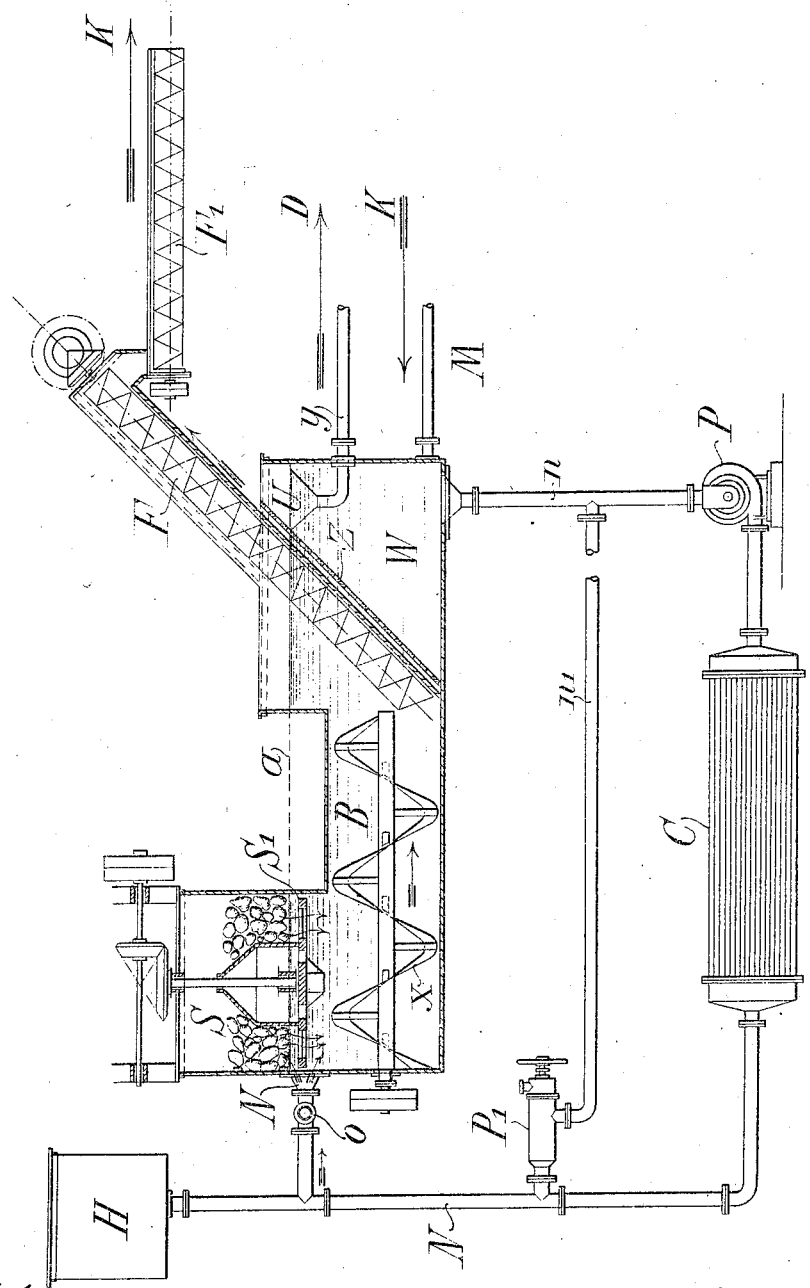

UNITED STATES PATENT OFFICE.

CARL STEFFEN, OF VIENNA, AUSTRIA-HUNGARY.

PROCESS FOR THE TREATMENT OF BEET-ROOT, &c.

No. 847,126.　　　　Specification of Letters Patent.　　Patented March 12, 1907.

Application filed July 29, 1903. Serial No. 167,516.

*To all whom it may concern:*

Be it known that I, CARL STEFFEN, a subject of the Emperor of Austria, residing at Vienna, in the Empire of Austria, have invented certain new and useful improvements in processes for the treatment of beet-root, sugar-cane, and the like preparatory to the extraction of the juices therefrom, of which the following is a specification.

In the usual processes for the extraction of the juices from beet-root, sugar-cane, and other sacchariferous plants the beet-root or cane is cut up or crushed before extracting the juices therefrom. This cutting up is effected either in the form of so-called "diffusion" cuttings or in the form of flat disks, according as the juice extraction is to be effected by the diffusion process or by the hot-pressing process. When beet-root in the shape of pulp is to be submitted to the pressing operation, the beet-root must previously be reduced in the known manner to a pulp. In the pressing process for sugar-cane this is first crushed. This cutting up or crushing, which always more or less exposes the interior of the plant to the atmosphere, is the cause of various disadvantages as regards the obtaining of pure juices and a good yield of sugar.

The present invention relates to a new preparatory process for treating the beet-root or cane during the cutting up or crushing process before the extraction of the juices either by the hot-pressing process or by the diffusion process or by the pulp-pressing process, whereby the said disadvantages are obviated. The said preparatory process consists, essentially, in cutting up the beet-root or cane in the form of diffusion chips or disks and in the presence of or under the simultaneous supply of sufficiently-large quantities of crude beet-root juice, such a diffusion juice, press juice, &c., being heated to a temperature of from 50° centigrade to boiling-point, (preferably 97° centigrade.) The cutting up is effected while the material is immersed in the hot juice, whereby, on the one hand, the cut surfaces are covered by the hot juices and, on the other hand, so large a quantity of hot juice is employed for a certain amount of beet-root or cane that a tolerably liquid mixture is produced. From the combined beet-root or cane cuttings and the juices associated therewith the heat of the juice is sufficient to produce in the said mixture a temperature of from 45° to 100° centigrade, (preferably about 85° centigrade.) A rapid interchange of heat takes place between the hot raw juice (scalding juice) and the beet-root or cane cuttings produced by the cutting-up device already during such cutting up and every exposed cut or crushed surface of the beet-root or cane comes at once in contact with sufficiently large quantities of hot juice for insuring such surfaces being raised to the desired temperature at the moment of their exposure to the scalding juice under exclusion of the air. The said scalding-juice supply which passes the cutting-up apparatus for the purpose of heating the beet-root or cane cuttings can, if necessary, be further heated in the cutting-up vessel by introducing steam into the juice, in which case the quantity of hot scalding juice supplied can be somewhat reduced.

By the exceedingly rapid heating of the beet-root or cane cuttings already during the cutting operation in the cutting device to temperatures varying between 45° and 100° centigrade (preferably 85° centigrade) and by the great quantities of heated scalding juice under simultaneous exclusion of air those circumstances are obviated which cause a deterioration of the juice and reduction in the yield of sugar when the beet-root or cane cuttings are then submitted to the operation of extraction of the juice by means of the diffusion process or of the pressing process.

The described treatment of the material with large quantities of hot raw juice as a scalding liquid differs very materially from the known method of heating the cuttings by means of steam, because the steam has not the power of effecting the sudden increase of temperature of the beet-root or cane cuttings, the surfaces of which in effecting the condensation of the steam receive a coating of water that prevents any rapid interchange of heat and which also reduces the quality of the juice.

In the accompanying drawing is shown by way of example an arrangement of apparatus by means of which the practical carrying out of the above-described process can be effected. S is a cutting apparatus the lower part of which is situated in a trough B, with which it communicates. The beet-root or cane is introduced into the top of the cutting apparatus, in which it is cut up by the revolving cutting-disk S' into diffusion chips or up disks. The cutting-disk is situated below the surface a of the liquor or juice with which the trough is filled and is thus immersed in the liquid. Raw juice heated to about 97° centigrade (scalding juice) is introduced into the trough B through a pipe N at about the level of the cutting-disk S'.

The supply of the scalding juice heated to about 97° centigrade through the pipe N is so proportioned as to amount to about five times the quantity of beet-root cut up by the cutting apparatus in a given time, the juice being made to impinge upon the cut material as it passes through the cutting-disk S'. The pipe N is for this purpose arranged tangentially to the periphery of the cutting apparatus, so that the beet-root cuttings as they pass through the cutters are obliged to come into intimate contact with the scalding juice which makes a rotating motion when entering the apparatus. The mixture of juice and beet-root cutting, which, with the above-mentioned temperature of 97° centigrade of the scalding juice, will at once assume a temperature of about 83° to 85° centigrade, is conveyed along the trough B to the rear end thereof by the transporting stirring device X, the beet-root or cane cuttings being there raised up out of the trough B freed from the juice by the conveying-worm F, which delivers the same to another worm F', that transports them to the locality at K, where the extraction of the juice from the hot cuttings by means of either diffusion or pressing processes is effected in the known manner. At the rear part of the trough B is a sieve z, through which the scalding juice having now a temperature of about 83° to 85° centigrade passes into the space W, the beet-root cuttings being retained by the sieve. From the space W the juice is led through pipe n' or n to a steam-injector P' or to a pump P, which communicates with a heater C and which propels it through the pipes N back into the front end of the trough B, the scalding juice being heated on its way either by direct steam in the injector P' or by passing through a suitable heater C, so as to attain the temperature of 97° centigrade again before passing into the trough. The raw juice extracted from the beet or cane cuttings at the extracting-works at K is also led through pipe M into the space W behind the sieve z in the trough B, where it mixes with the circulating scalding juice. In the space W is an overflow-pipe U, through which the excess of juice equal in quantity to that coming from K is led off and is conducted to the sugar-factory through a pipe y.

If stones require to be removed from the cutting apparatus from time to time, the level of the juice in the scalding-trough is allowed to sink below the cutting-disk S', this being effected by closing the cock o on the pipe N and causing the pump P to force a corresponding portion of the juice up into the tank H, where it is stored until the apparatus has been cleared of stones.

If the juice-extracting apparatus at K is a diffusion-battery, the mixture of scalding juice and beet or cane cuttings can be made to flow from the parts of the trough B in front of sieve z directly into the diffusers, where the separation of the scalding juice from the beet cuttings is effected in any desirable way. In this case the pump P is put in direct communication with the bottom discharge (the space beneath the sieves or the overflow-pipe) of the diffuser and propels the separated scalding juice through the heater C and pipe N freshly heated back again into the trough B until the feeding of the diffuser with heated beet or cane cuttings is completed. The diffusion juice discharged from the battery (through measuring apparatus, &c.) is then made to take the same course to the pump P as the scalding juice that is led back from the diffuser after having conveyed the heated beet cuttings thereto. The juice accumulating in the scalding-trough B is led off, as before stated, through overflow-pipe U and pipe y to the sugar-factory at D.

If the beet-root is to be worked up into pulp instead of being cut up, the pulping apparatus of suitable known construction is so arranged that the working surfaces of the same are below the level of the juice in the same way as the cutter of the cutting apparatus, and the hot scalding juice is made to pass in contact with the pulping devices in the same proportional quantity as above described with reference to the cutting apparatus. If sugar-cane is to be treated by the pressing process, crushing-rollers are substituted for the cutting or pulping apparatus for crushing the cane as it is fed in, the crushing-rollers being arranged to work under the level of the scalding juice, and the hot scalding juice is made to flow in the indicated quantities through the rollers, together with the crushed cane, and fed to the scalding-trough B.

At the rear end of the trough B the heated crushed cane separated from the scalding juice is then delivered to the presses in some suitable way. In the said presses the cane while in a hot state is pressed out, while the separated scalding juice together with that pressed out of the cane are led back to the trough B as above described with reference to the diffusion apparatus.

If during the disintegration of the beet in the cutting apparatus into diffusion cuttings, the above-described operation having for purpose to keep the cuttings out of contact with the air and to maintain the mixture of beet-root juice and cuttings in a sufficiently liquid condition, is to be carried out with raw juice or diffusion juice at ordinary temperature or below 50° centigrade instead of with heated raw beet-juice, the mode of proceeding in the cutting apparatus and in the mixing-trough is the same as above described with reference to the hot scalding juice; but the heating device C and the worm conveyer F are dispensed with, because the mixture of beet cuttings and diffusion juice is made to flow directly into the diffusion-battery.

In the diffusion-battery or in the diffuser which is to be filled a part of the quantity of the juice is separated from the mixture of materials, and, namely, the separated quantity of the juice is such that the diffuser which is being filled can be filled up with the necessary quantity of cuttings, and a sufficient quantity of juice remains therein for enabling to keep the cuttings in an immersed condition. When the diffuser thus filled with cuttings and with the necessary quantity of juice has been closed, the remaining juice is only then entirely separated during the diffusion process and, viz., by driving off the diffusing liquid by pressure. In this manner the beet cuttings are entirely preserved from any admission of atmospheric air from the moment of the commencement of the cutting operation until the juice is completely extracted from the same.

I claim—

1. A process consisting of disintegrating sacchariferous plants, and subjecting the same while being disintegrated to the action of a sacchariferous liquid.

2. A process consisting of disintegrating sacchariferous plants, and subjecting the same while being disintegrated to the action of a heated sacchariferous liquid.

3. A process consisting of disintegrating sacchariferous plants, and subjecting the same while being disintegrated to the action of hot beet juice.

4. A process consisting of disintegrating sacchariferous plants, subjecting the same while being disentegrated to the action of a sacchariferous liquid, and subsequently separating the solid and liquid matter.

5. A process consisting of disintegrating sacchariferous plants, subjecting the same while being disintegrated to the action of a sacchariferous liquid, then separating the solid and liquid and finally utilizing the liquid to act upon a fresh supply of sacchariferous plants.

6. The herein-described process of treating sugar-beets and other plants for the purpose of extracting sugar or other substances therefrom, which consists in cutting or disintegrating said plants while they are surrounded by an extracting liquid.

7. The herein-described process of treating sugar-beets and other plants for the purpose of extracting sugar or other substances therefrom, which consists in heating and at the same time cutting or disintegrating said plants while they are surrounded by an extracting liquid.

8. The herein-described process of treating sugar-beets and other plants for the purpose of extracting sugar or other substances therefrom, which consists in cutting or disintegrating said plants while they are surrounded by a hot extracting liquid.

9. The herein-described process of treating sugar-beets and other plants for the purpose of extracting sugar or other substances therefrom, which consists in cutting or disintegrating said plants while they are surrounded by an extracting liquid, and returning the resulting liquid into contact with the plants undergoing disintegration.

10. The herein-described process of treating sugar-beets, and other plants for the purpose of extracting sugar or other substances therefrom, which consists in cutting or disintegrating said plants while they are surrounded by an extracting liquid, returning the resulting liquid into contact with the plants undergoing disintegration, and heating said liquid on its return-path.

11. The herein-described process of treating sugar-beets and other plants for the purpose of extracting sugar or other substances therefrom, which consists in cutting or disintegrating said plants while they are surrounded by an extracting liquid, then extracting the juice from the material, and returning the extracted juice into contact with the plants undergoing disintegration.

12. The herein-described process of treating sugar-beets and other plants for the purpose of extracting sugar or other substances therefrom, which consists in cutting or disintegrating said plants while they are surrounded by an extracting liquid, then extracting the juice from the material, returning the extracted juice into contact with the plants undergoing disintegration, and heating said juice on its return-path.

13. The herein-described process of treating sugar-beets and other plants for the purpose of extracting sugar or other substances therefrom, which consists in cutting or disintegrating said plants while they are surrounded by an extracting liquid, and then separating the extracted juice from the remaining material.

14. The herein-described process of treating sugar-beets and other plants for the purpose of extracting sugar or other substances therefrom, which consists in cutting or disintegrating said plants while they are surrounded by an extracting liquid, then separating the extracted juices from the remaining material, and thereupon subjecting this remaining material to pressure.

15. The herein-described process of treating sugar-beets and other plants for the purpose of extracting sugar or other substances therefrom, which consists in cutting or disintegrating said plants while they are surrounded by an extracting liquid, then separating the extracted juice from the remaining material, subjecting this remaining material to pressure to extract a further amount of juice therefrom, and returning this juice into contact with the material.

In testimony whereof I have hereunto set my hand in presence of two subscribing witnesses.

CARL STEFFEN.

Witnesses:
ALVESTO S. HOGUE,
AUGUST FUGGER.